(12) United States Patent
Shibata

(10) Patent No.: US 9,709,940 B2
(45) Date of Patent: Jul. 18, 2017

(54) IMAGE FORMING APPARATUS

(71) Applicant: KYOCERA Document Solutions Inc., Osaka (JP)

(72) Inventor: Naoki Shibata, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/163,942

(22) Filed: May 25, 2016

(65) Prior Publication Data

US 2016/0349686 A1 Dec. 1, 2016

(30) Foreign Application Priority Data

May 28, 2015 (JP) ................................. 2015-108865

(51) Int. Cl.
*G03G 15/00* (2006.01)
*H04N 1/00* (2006.01)

(52) U.S. Cl.
CPC ..... *G03G 15/5016* (2013.01); *H04N 1/00384* (2013.01); *H04N 1/00493* (2013.01); *H04N 1/00559* (2013.01); *H04N 2201/0094* (2013.01)

(58) Field of Classification Search
CPC combination set(s) only.
See application file for complete search history.

(56) References Cited

U.S. PATENT DOCUMENTS

2007/0071476 A1* 3/2007 Watanabe .......... G03G 15/5016
399/81

FOREIGN PATENT DOCUMENTS

JP 2011-258335 12/2011

* cited by examiner

*Primary Examiner* — Clayton E Laballe
*Assistant Examiner* — Jas Sanghera
(74) *Attorney, Agent, or Firm* — Wenderoth, Lind & Ponack, L.L.P.

(57) ABSTRACT

A fixing member has a fixing body, which slidably moves in a straight line direction, and a first engaging part. The first engaging part projects downward from a lower surface of the fixing body to pass through an operation panel. The first engaging part is engaged with a part to be engaged formed on a lower surface of the operation panel, thereby restricting the fixing body so as not to move in the straight line direction. A space is formed in a height direction between one side end portion in the straight line direction of the fixing body and the upper surface of the operation panel. When the one side end portion in the straight line direction of the fixing body is pressed downward and is subjected to bending deformation, engagement of the first engaging part and the part to be engaged is released.

4 Claims, 8 Drawing Sheets

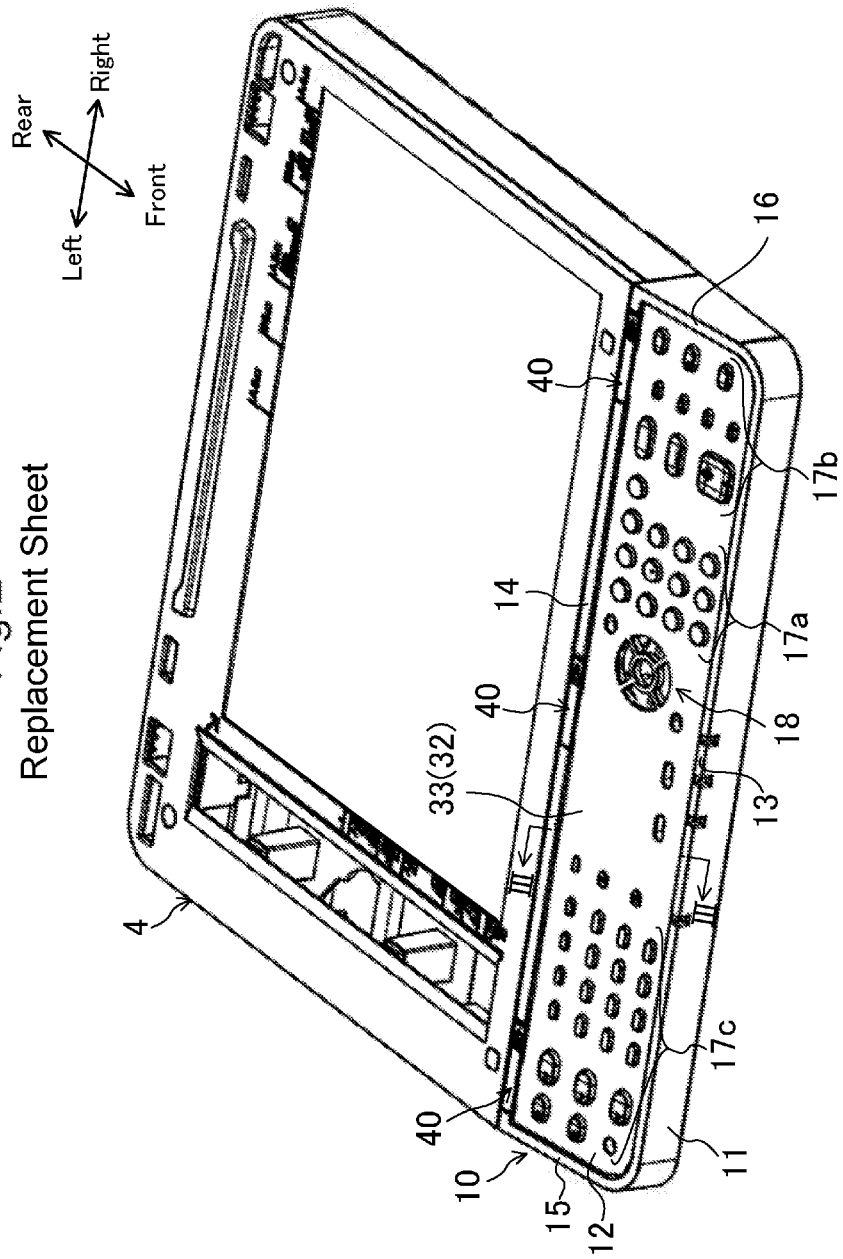
Fig.2
Replacement Sheet

IMAGE FORMING APPARATUS

CROSS-REFERENCE TO RELATED APPLICATION

This application is based upon and claims the benefit of priority from Japanese Patent Application No. 2015-108865 filed on May 28, 2015, the entire contents of which are incorporated herein by reference.

BACKGROUND

The technology of the present disclosure relates to an image forming apparatus.

Conventionally, an image forming apparatus such as a printer, a facsimile, and a multifunctional peripheral includes an operation panel for receiving user's operations. In the operation panel, one or a plurality of operation buttons, which are used when a user allows the image forming apparatus to perform predetermined functions, are arranged.

There is a case in which a function display sheet, on which names and the like of the functions have been displayed with a language, is placed on an upper surface of the operation panel in order to inform the user of the functions of the operation buttons. Normally, the function display sheet is replaceable. On an upper surface of the function display sheet, a transparent cover member is placed. The transparent cover member has a transparent plate part that covers the function display sheet and a projection piece part that projects outward from a peripheral edge portion of the transparent plate part. The projection piece part has been fixed to the operation panel by a fixing member. This fixing member has been provided to a peripheral edge portion of the operation panel.

The aforementioned fixing member has an abutting piece that abuts an upper surface of the projection piece part and a shaft fixed to the abutting piece. The abutting piece is vertically rotatable by using the shaft as a fulcrum. When the fixing of the projection piece part of the transparent cover member by the abutting piece is released, a nail is hooked to one end portion of the abutting piece to lift up the one end portion. Then, the abutting piece is rotated by using the shaft as a fulcrum, so that the fixing of the projection piece part by the abutting piece is released.

SUMMARY

An image forming apparatus according to one aspect of the present disclosure includes an image forming apparatus body, an operation panel, a display plate, a transparent cover member, and a fixing member. The operation panel is fixed to the image forming apparatus body. The operation panel is provided on an upper surface thereof with an operation button. The display plate is placed on the upper surface of the operation panel so as to be replaceable. The display plate displays information on the operation button. The transparent cover member has a transparent plate part covering the display plate and a projection piece part projecting outward from a peripheral edge portion of the plate part. The fixing member holds the projection piece part of the transparent cover member between the operation panel and the fixing member, thereby fixing the projection piece part to the operation panel.

The fixing member has a fixing body and a first engaging part. The fixing body is configured to slidably move in a straight line direction in the state in which the fixing body has abut the projection piece part of the transparent cover member. The first engaging part projects downward from a lower surface of the fixing body to pass through the operation panel. The first engaging part is engaged with a first part to be engaged formed on a lower surface of the operation panel, thereby restricting the fixing body so as not to move in the straight line direction. A space is formed in a height direction between one side end portion in the straight line direction of the fixing body and the upper surface of the operation panel. In a restriction state in which the fixing body has been restricted so as not to move in the straight line direction, when the one side end portion of the straight line direction of the fixing body is pressed downward and is subjected to bending deformation, engagement of the first engaging part and the first part to be engaged is released due to the bending deformation. In this way, slide movement from the other side to one side in the straight line direction of the fixing body is permitted.

BRIEF DESCRIPTION OF THE DRAWINGS

FIG. 2 is a perspective view illustrating an image reading unit and an operation unit fixed to the image reading unit.

DETAILED DESCRIPTION

Hereinafter, one example of an embodiment will be described in detail on the basis of the drawings. It is noted that the technology of the present disclosure is not limited to the following embodiments.

Figure 1:
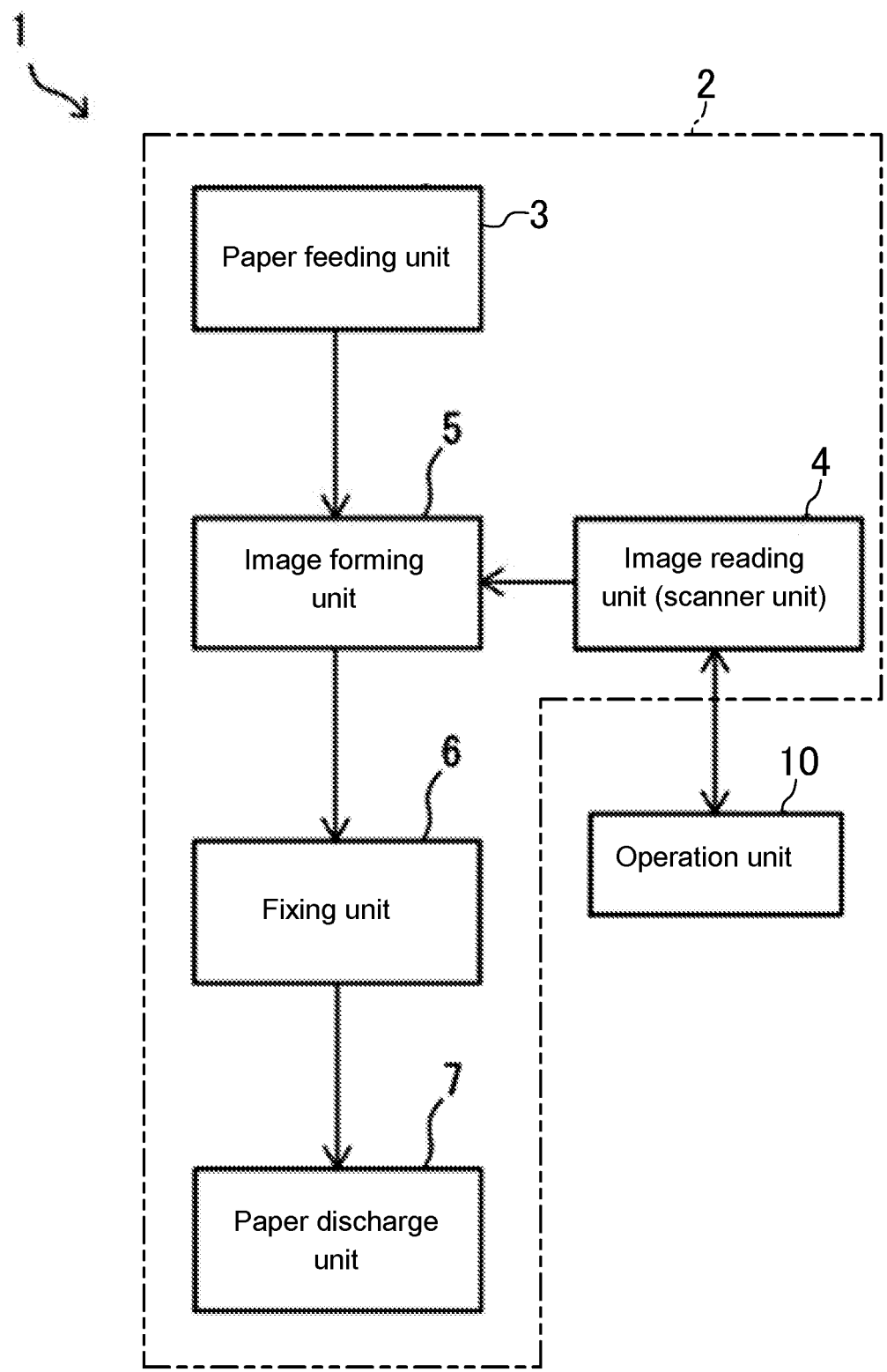
FIG. 1 is a block diagram illustrating a schematic configuration of an image forming apparatus in an embodiment.

As illustrated in FIG. 1, an image forming apparatus 1 of the present embodiment, for example, is a multifunctional peripheral (MFP) and has an image forming apparatus body 2 and an operation unit 10. The image forming apparatus body 2 includes a paper feeding unit 3, an image reading unit 4 (a scanner unit), an image forming unit 5, a fixing unit 6, and a paper discharge unit 7. The image reading unit 4 is provided at an upper portion of the image forming apparatus body 2 and the operation unit 10 is provided at a front side of the image reading unit 4. At a center portion and a lower portion of the image forming apparatus body 2, the image forming unit 5, the fixing unit 6, and the paper feeding unit 3 are provided. The paper discharge unit 7 is provided below the image reading unit 4.

The paper feeding unit 3 is a cassette paper feeding unit or a manual feed tray that supplies a paper to the image forming unit 5. The image reading unit 4 reads a document as an image. In the operation unit 10, various operations of the image forming apparatus 1 are performed by a user. Although not illustrated in the drawing, the image forming unit 5 includes a photosenstive drum, and a charging device, a developing device, a transfer roller and the like arranged around the photosenstive drum. In the image forming unit 5, a toner image is transferred to the paper supplied from the paper feeding unit 3 on the basis of image data read by the image reading unit 4 or image data transmitted from an external terminal. The fixing unit 6 includes a fixing roller and a pressure roller (not illustrated in any drawings) brought into press contact with each other to rotate, and fixes an image (the toner image), which has been transferred to the paper in the image forming unit 5, to the paper. The paper discharge unit 7 receives the paper subjected to the image formation and supplied from the fixing unit 6.

The operation unit 10 has operation buttons for performing various functions of the image forming apparatus 1. The operation unit 10 receives operation signals of the operation buttons by a user and allows the image forming apparatus body 2 to perform predetermined image formation operations in response to the received operation signals. It is noted that the operation buttons are not limited to push buttons and for example, may also be retractable buttons, seesaw buttons, touch buttons, rotary knobs, rotary levers, sliding levers and the like. The operation buttons also include a cursor 18 to be described later and the like.

As illustrated in FIG. 2, the operation unit 10 has a flat and hollow operation case 11 opened upward and an operation panel 12 that closes an upper side of the operation case 11. In the following description, it is assumed that a left side and a right side indicate a left side and a right side when the image forming apparatus 1 is viewed from a front side (that is, a side at which the operation panel 12 is positioned).

The operation case 11 and the operation panel 12 have a rectangular shape long in the right and left direction in a plan view. On an upper surface of the operation panel 12, a front frame part 13, a rear frame part 14, a left frame part 15, and a right frame part 16 are formed along a peripheral edge portion of the operation panel 12. Inside the frame parts 13 to 16 on the upper surface of the operation panel 12, button groups 17a to 17c including a plurality of operation buttons, a cursor 18 and the like are arranged.

Figure 3:
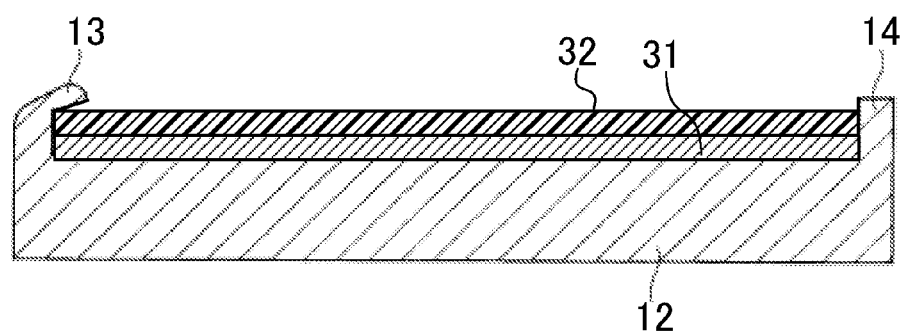
FIG. 3 is a sectional view taken along line III-III of FIG. 2.

As illustrated in FIG. 3, on the upper surface of the operation panel 12, a display plate 31, in which information (for example, functions and names) on each operation button has been displayed with a specific language, is placed. The display plate 31, for example, includes a paper sheet, a plastic film sheet and the like. It is noted that display of the display plate 31 may be a mark and the like, which allow the information of the operation buttons to be visually recognized by a user, as well as the language.

Moreover, at an upper side of the display plate 31, a transparent cover member 32 is placed. The transparent cover member 32 has transparency enough for visually recognizable functions and names displayed on the display plate 31. The transparent cover member 32, for example, includes a transparent plastic material and the like.

Figure 4:
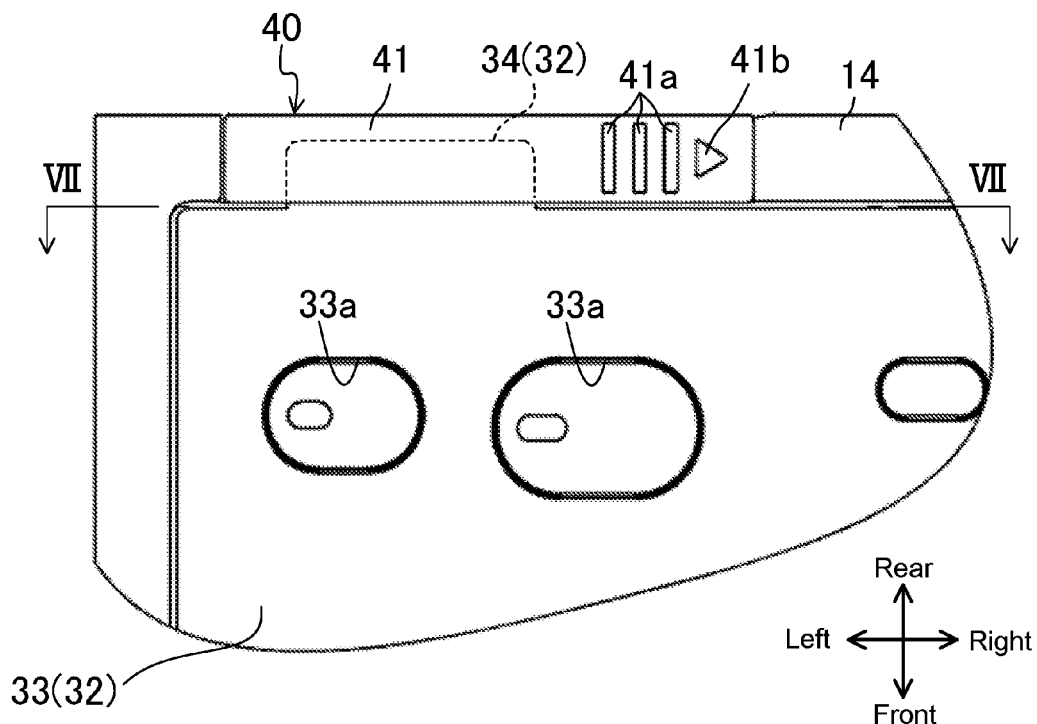
FIG. 4 is an enlarged view of the leftmost fixing member of three fixing members for fixing a transparent cover member and a peripheral portion thereof.
Figure 5:
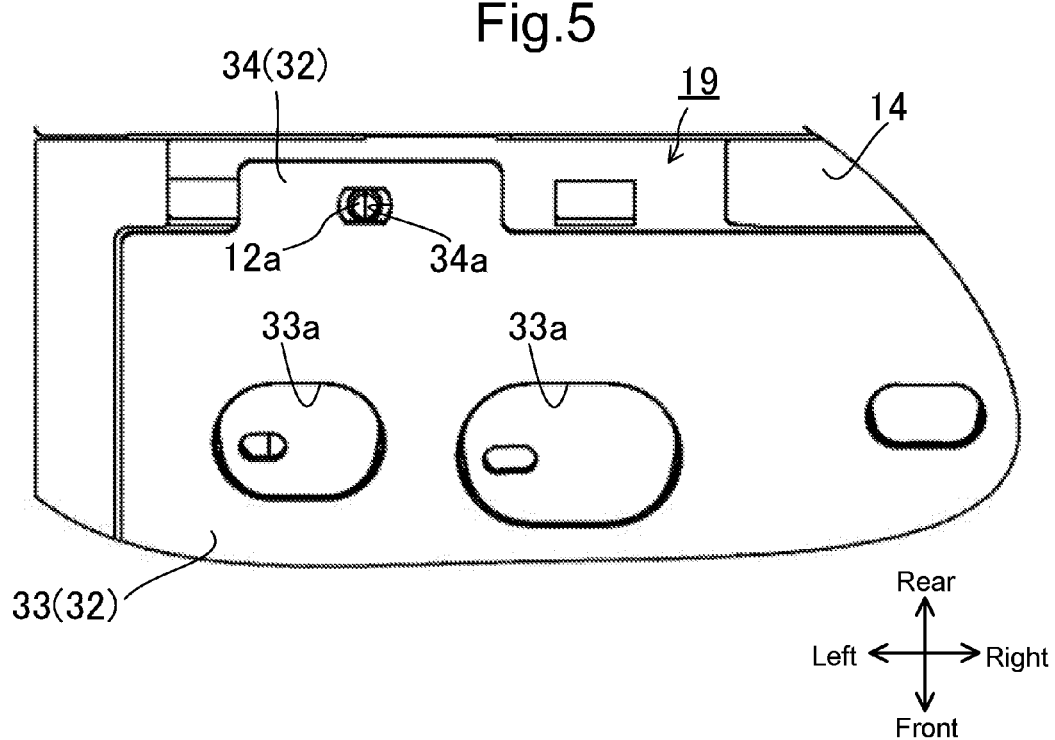
FIG. 5 is a diagram corresponding to FIG. 4, which illustrates a state in which the leftmost fixing member has been removed.

As illustrated in FIG. 4 and FIG. 5, the transparent cover member 32 has a plate part 33 that covers the display plate 31 and three projection piece parts 34 (FIG. 4 and FIG. 5 illustrate only the leftmost projection piece part 34) formed at a rear edge portion of the plate part 33 while being spaced apart from one another in the right and left direction.

The plate part 33 is formed with a plurality of through holes 33a for allowing the operation buttons and the like to pass therethrough. Although not illustrated in the drawings, similarly, the display plate 31 is also formed with a plurality of through holes for allowing the operation buttons and the like to pass therethrough.

The each projection piece part 34 projects toward a rear side from the rear edge portion of the plate part 33. Each projection piece part 34 has a rectangular plate shape long in the right and left direction. Each projection piece part 34 is formed at a center part in the right and left direction thereof with an engaging hole 34a (see FIG. 5) long in the right and left direction. The engaging hole 34a is engaged with an engaging projection 12a that projects from the upper surface of the operation panel 12, so that the positioning of the transparent cover member 32 on the operation panel 12 is performed.

The each projection piece part 34 is fixed to the operation panel 12 by a fixing member 40 (see FIG. 4). The fixing member 40 is detachable with respect to the operation panel 12 and is detached from the operation panel 12, so that the display plate 31 and the transparent cover member 32 are replaceable.

Figure 6:
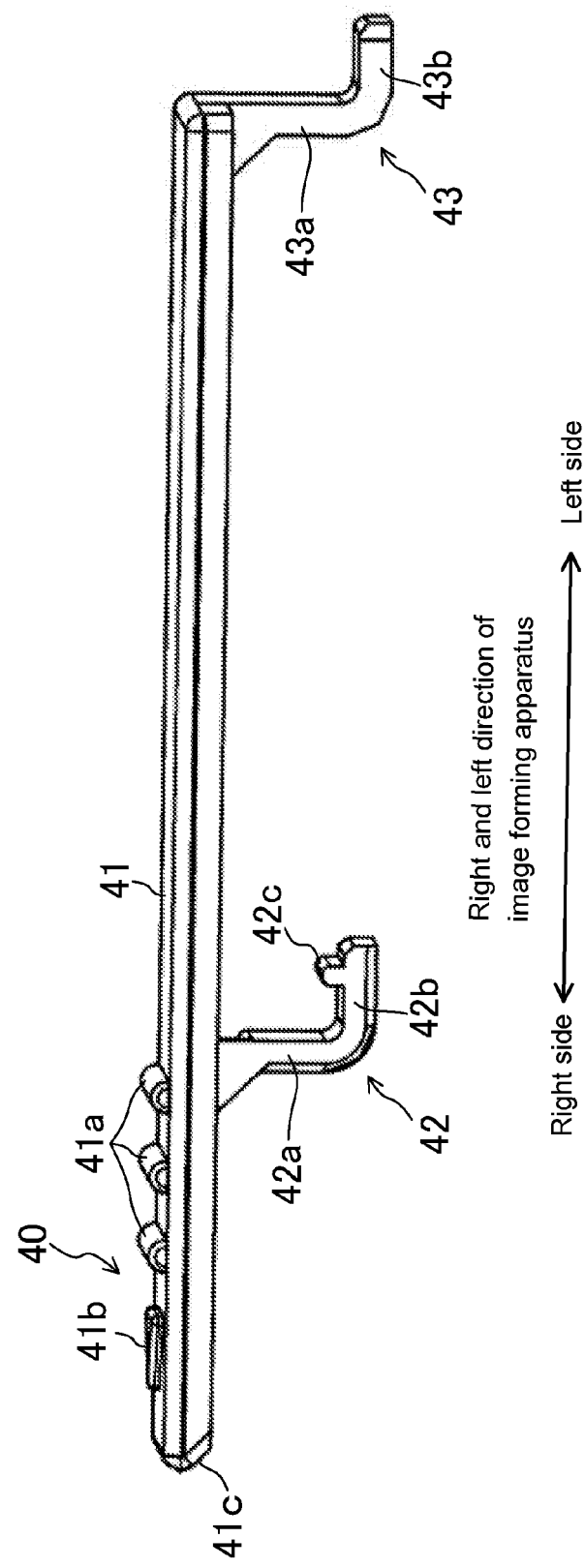
FIG. 6 is a perspective view illustrating a fixing member.

As illustrated in FIG. 6, the fixing member 40 has a fixing body 41, a first engaging part 42, and a second engaging part 43. The fixing body 41 has a rectangular plate shape long in the right and left direction. The fixing body 41 abuts the upper surface of the projection piece part 34 (see FIG. 5) and holds the projection piece part 34 between the operation panel 12 and the fixing body 41. The fixing body 41 is configured to slidably move in the right and left direction (the straight line direction) in the state in which the fixing body 41 has abut the upper surface of the projection piece part 34. At the right end portion on an upper surface of the fixing body 41, three projections 41a are arranged at regular intervals in the right and left direction. Each projection 41a is formed in a semi-cylindrical shape extending in the front and rear direction (a direction perpendicular to the right and left direction which is a slide direction) of the fixing body 41. Moreover, a projection 41b is provided at a right side from the three projections 41a on the upper surface of the fixing body 41 to indicate a direction in which the fixing body 41 is detached. The projection 41b is formed in a triangular shape in which its width becomes narrow from the left side to the right side in a plan view (see FIG. 4).

The first engaging part 42 has a vertical plate portion 42a, a horizontal plate portion 42b, and an engaging claw 42c. The vertical plate portion 42a is hung down from an intermediate part in the right and left direction on a lower surface of the fixing body 41. The horizontal plate portion 42b projects leftward from a lower end portion of the vertical plate portion 42a. The engaging claw 42c projects upward from a vicinity of a front end portion of the horizontal plate portion 42b.

The second engaging part 43 has a vertical plate portion 43a and a horizontal plate portion 43b. The vertical plate portion 43a is hung down from a left end portion on the lower surface of the fixing body 41. The horizontal plate portion 43b projects leftward from a lower end portion of the vertical plate portion 43a.

Figure 7:
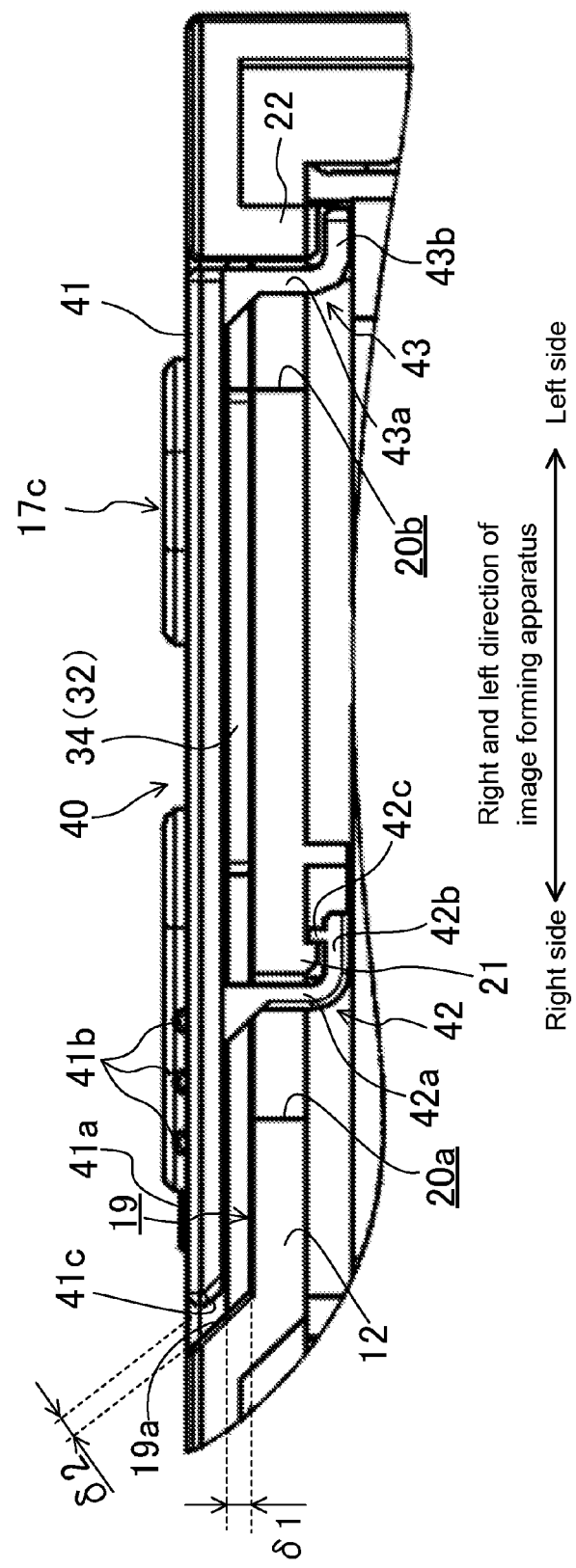
FIG. 7 is a sectional view taken along line VII-VII of FIG. 4.

Furthermore, when fixing the display plate 31 and the transparent cover member 32, the three fixing members 40 are fitted into three mounting concave parts 19 (see FIG. 7) formed in the rear frame part 14 of the operation panel 12. The three mounting concave parts 19 are formed at both end portions and a center portion in the right and left direction of the rear frame part 14 (FIG. 2), respectively.

The bottom surface of the mounting concave part 19 is configured by a part of the upper surface of the operation panel 12. The mounting concave part 19 is formed at the bottom surface thereof with a pair of insertion holes 20a and 20b that pass through the operation panel 12 in a vertical direction (a thickness direction of the operation panel 12). The pair of insertion holes 20a and 20b are formed in the right and left direction while being spaced apart from one another in the right and left direction. Into the right insertion hole 20a, the vertical plate portion 42a of the first engaging part 42 is inserted, and into the left insertion hole 20b, the vertical plate portion 43a of the second engaging part 43 is inserted. In the vicinity of the insertion hole 20a in the operation panel 12, a claw 21 to be engaged protrudes as a first part to be engaged. Inside the left insertion hole 20b, a projection part 22 passes through it to project downward from the rear frame part 14. The projection part 22 corresponds to a second part to be engaged. A lower end surface of the projection part 22 serves as a horizontal surface.

Furthermore, the engaging claw 42c of the first engaging part 42 is engaged with the claw 21 to be engaged of the lower surface of the operation panel 12, so that the fixing body 41 is restricted so as not to move in the right and left direction. In this restriction state, between a right end portion (one side end portion) of the fixing body 41 and the upper surface of the operation panel 12, a space 61 is formed in a height direction. Furthermore, between a right end surface (a first inclination surface to be described later) of 41c the fixing body 41 and a right wall surface 19a (a second inclination surface to be described later) of the mounting concave part 19, a space δ2 is formed. Furthermore, in the aforementioned restriction state, the second engaging part 43 is engaged with the projection part 22 fixed to the operation panel 12.

The right end surface of the fixing body 41 serves as a first inclination surface 41c which is inclined upward from the left side to the right side. The right wall surface of the mounting concave part 19 serves as a second inclination surface 19a which is a surface parallel to the first inclination surface 41c and is inclined upward from the left side to the right side.

Figure 8:
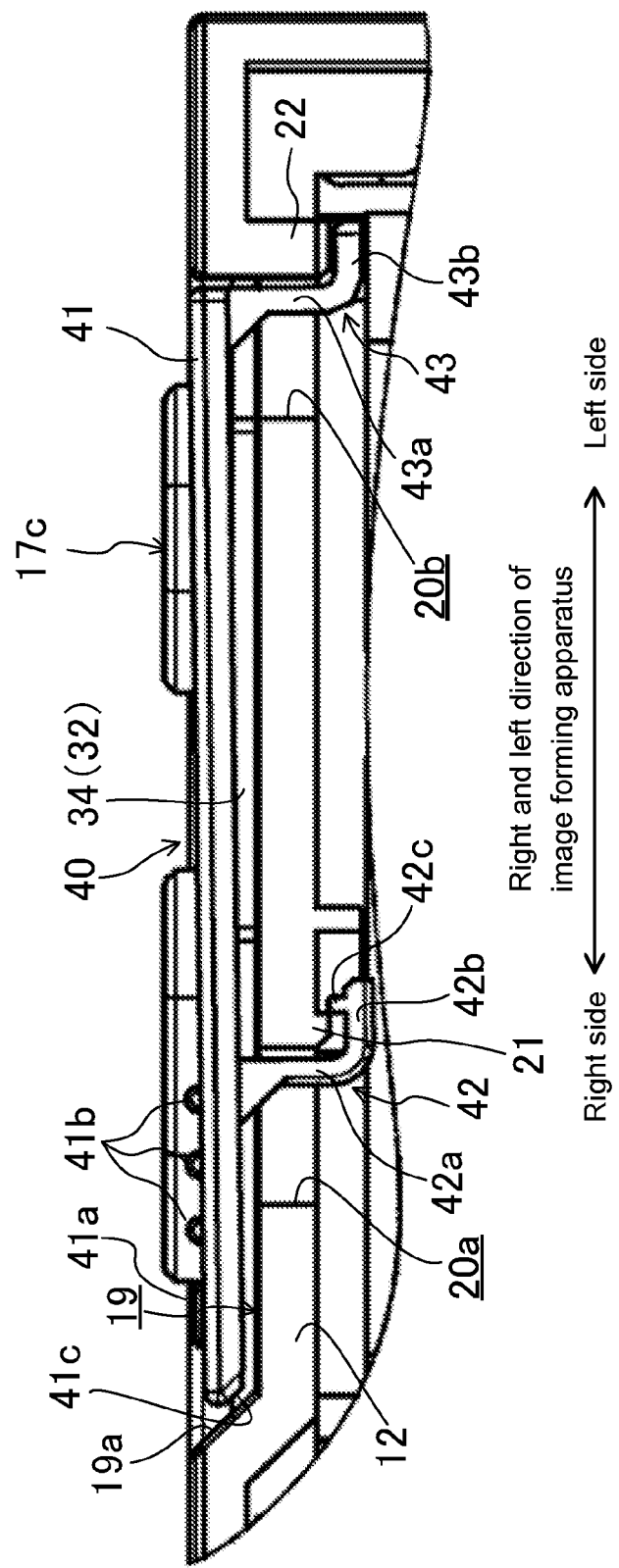
FIG. 8 is a diagram corresponding to FIG. 7, which illustrates a state in which a right side end portion of a fixing body has been pressed down.
Figure 9:
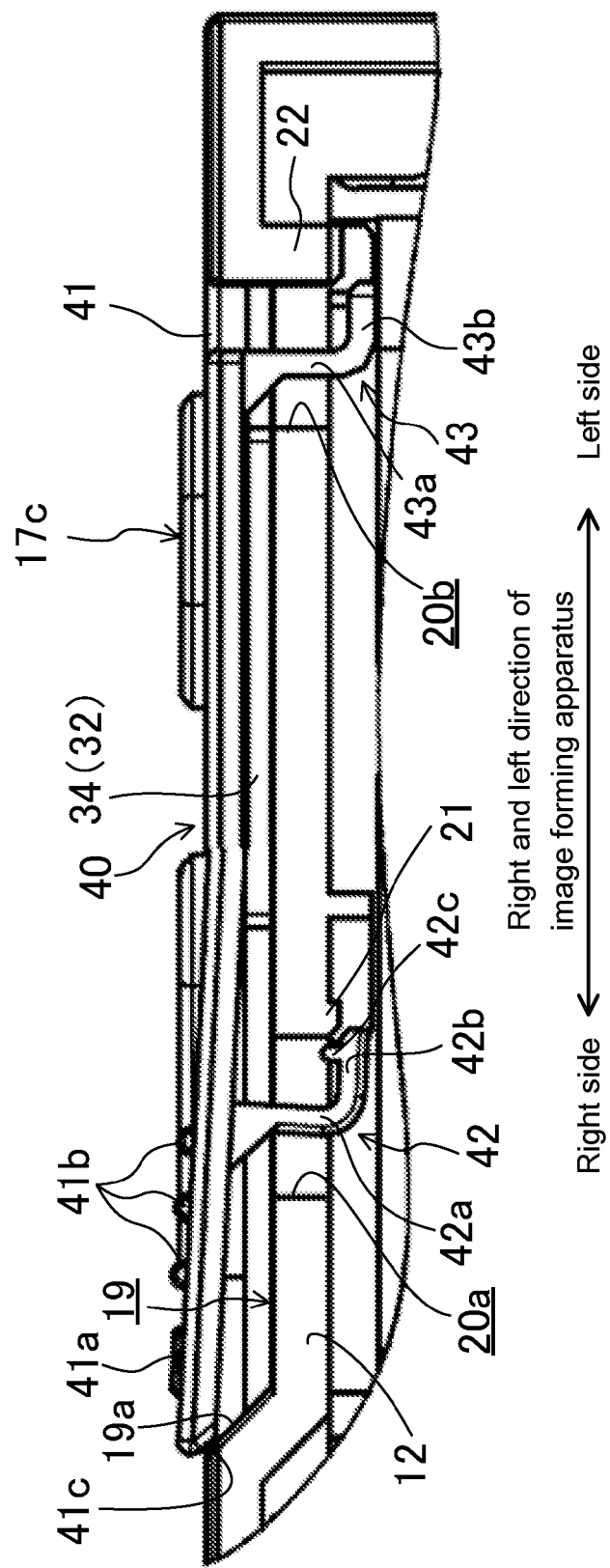
FIG. 9 is a diagram corresponding to FIG. 7, which illustrates a state in which a fixing body has been slidingly moved from the left side to the right side.

When a user detaches the fixing member 40 from the operation panel 12, the user presses down the right end portion of the fixing body 41 with his/her fingers. Then, as illustrated in FIG. 8, the right end portion of the fixing body 41 is bent downward. Furthermore, due to this bending deformation, the engaging claw 42c of the first engaging part 42 moves downward, so that the engagement of the engaging claw 42c and the claw 21 to be engaged is released. As a consequence, the movement of the fixing body 41 from the left side to the right side is permitted. Consequently, in this state, the fixing body 41 is slidingly moved with fingers from the left side to the right side, so that it is possible to detach the fixing member 40 from the operation panel 12. In this detachment work, since it is not necessary to hook a nail to an end portion of the fixing member 40, a burden applied to a nail of a user is reduced, so that it is possible to improve the stability in the detachment work of the fixing member 40. Furthermore, it is possible to easily detach the fixing member 40 from the operation panel 12 by simple work of pressing the fixing body 41 with fingers so as to slide.

Furthermore, in the aforementioned embodiment, at the right end portion of the fixing body 41, the first inclination surface 41c inclined upward from the left side to the right side is formed, and similarly, at the right wall surface of the mounting concave part 19, the second inclination surface 19a inclined upward from the left side to the right side is formed.

Consequently, in the detachment work of the fixing member 40, the fixing body 41 is allowed to move from the left side to the right side, so that the first inclination surface 41c of the fixing body 41 slides along the second inclination surface 19a of the mounting concave part 19 and is pushed up. Consequently, it is possible to easily detach the fixing member 40 without forcibly pulling it up with fingers.

In addition, in the aforementioned embodiment, the second engaging part 43 formed at the left end portion of the fixing body 41 is engaged with the projection part 22 fixed to the operation panel 12. Consequently, when the right end portion of the fixing body 41 has been pressed downward, even though the left end portion of the fixing body 41 floats up by reaction force, the horizontal plate portion 43b of the second engaging part 43 abuts the lower end surface of the projection part 22, so that the floating is restrained. Consequently, it is possible to prevent a downward bending amount of the right end portion of the fixing body 41 from being reduced by the floating of the left end portion. Thus, it is possible to reliably release the engagement of the engaging claw 42c and the claw 21 to be engaged according to the bending deformation of the right end portion of the fixing body 41.

Moreover, in the aforementioned embodiment, at the right end portion of the upper surface of the fixing body 41, the plurality of projections 41a extending in the front and rear direction are formed. Consequently, when the right end portion of the fixing body 41 is allowed to slide by pressing it with fingers, the plurality of projections 41a serve as a slip stopper. Consequently, it is possible to easily and reliably perform a slide operation of the fixing body 41. In addition, since each projection 41a is formed in a semi-cylindrical shape, it is possible to reduce pressure applied to fingers from each projection 41a as compared with the case in which each projection 41a is formed in a columnar shape. Thus, stability when detaching the fixing member 40 is not impaired. It is noted that the projection 41a may be discarded and the projection 41b indicating the slide direction of the fixing body 41 may also be used as the slip stopper.

<<Other Embodiments>>

In the aforementioned embodiment, the example, in which the image forming apparatus 1 is a multifunctional peripheral, has been described; however, the technology of the present disclosure is not limited thereto and the image forming apparatus, for example, may also include a copy machine, a facsimile, a printer and the like.

What is claimed is:
1. An image forming apparatus comprising:
an image forming apparatus body;
an operation panel fixed to the image forming apparatus body and provided on an upper surface thereof with an operation button;
a display plate placed on the upper surface of the operation panel so as to be replaceable and displaying information on the operation button;
a transparent cover member having a transparent plate part covering the display plate and a projection piece part projecting outward from a peripheral edge portion of the plate part; and
a fixing member holding the projection piece part of the transparent cover member between the operation panel and the fixing member, thereby fixing the projection piece part to the operation panel,
wherein the fixing member has a fixing body, which slidably moves in a straight line direction in a state in which the fixing body has abut the projection piece part of the transparent cover member, and a first engaging part which projects downward from a lower surface of the fixing body to pass through the operation panel and is engaged with a first part to be engaged formed on a lower surface of the operation panel, thereby restricting the fixing body so as not to move in the straight line direction, a space is formed in a height direction between one side end portion in the straight line direction of the fixing body and the upper surface of the operation panel, and in a restriction state in which the fixing body has been restricted so as not to move in the straight line direction, when the one side end portion in the straight line direction of the fixing body is pressed downward and is subjected to bending deformation, engagement of the first engaging part and the first part to be engaged is released due to the bending deformation, so that slide movement from another side to one side in the straight line direction of the fixing body is permitted.

2. The image forming apparatus of claim 1, wherein the operation panel is formed on a peripheral portion thereof with a mounting concave part in which the fixing body is mounted, at one side end portion in the straight line direction of the mounting concave part, a first inclination surface inclined upward from the other side to the one side in the straight line direction is formed, and at the one side end portion in the straight line direction of the fixing body, a second inclination surface inclined upward from the another side to the one side in the straight line direction is formed.

3. The image forming apparatus of claim 1, wherein, at another side end portion in the straight line direction of the fixing body, a second engaging part engaged with a second part to be engaged formed at the operation panel is formed in the restriction state, and when the one side end portion of the fixing body has been pressed, the second engaging part restrains upward movement of the another side end portion such that the another side end portion is not floated up.

4. The image forming apparatus of claim 1, wherein, at one end portion in the straight line direction on an upper surface of the fixing body, a projection extending in a direction perpendicular to the straight line direction is formed.

* * * * *